(12) United States Patent
Lor et al.

(10) Patent No.: US 9,817,489 B2
(45) Date of Patent: Nov. 14, 2017

(54) TEXTURE CAPTURE STYLUS AND METHOD

(71) Applicant: Apple Inc., Cupertino, CA (US)

(72) Inventors: Jason Lor, San Francisco, CA (US); Patrick A. Carroll, San Francisco, CA (US); Glen A. Rhodes, San Francisco, CA (US); Dustin J. Verhoeve, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/165,501

(22) Filed: Jan. 27, 2014

(65) Prior Publication Data
US 2015/0212602 A1 Jul. 30, 2015

(51) Int. Cl.
*G06F 3/0354* (2013.01)
*G06F 3/033* (2013.01)
*G06F 3/00* (2006.01)
*G06F 3/048* (2013.01)
*G06F 3/042* (2006.01)

(52) U.S. Cl.
CPC .......... *G06F 3/03545* (2013.01); *G06F 3/002* (2013.01); *G06F 3/033* (2013.01); *G06F 3/048* (2013.01); *G06F 3/0425* (2013.01)

(58) Field of Classification Search
CPC ...... G06F 3/033; G06F 3/048; G06F 3/03545; G01B 11/002
See application file for complete search history.

(56) References Cited

U.S. PATENT DOCUMENTS

| | | | |
|---|---|---|---|
| 4,829,456 A * | 5/1989 | Joonishi | G06T 17/20 345/419 |
| 5,774,571 A | 6/1998 | Marshall | |
| 5,898,438 A * | 4/1999 | Stewart | G06T 15/04 345/419 |
| 5,959,616 A | 9/1999 | Challener | |
| 6,151,015 A | 11/2000 | Badyal et al. | |
| 6,188,392 B1 * | 2/2001 | O'Connor | G06F 3/03545 178/18.01 |
| 6,307,956 B1 | 10/2001 | Black | |
| 6,473,072 B1 | 10/2002 | Comiskey et al. | |
| 6,621,697 B2 | 9/2003 | O'Hara et al. | |
| 6,690,369 B1 * | 2/2004 | Smith, Jr. | G06T 15/10 345/419 |
| 6,760,024 B1 * | 7/2004 | Lokovic | G06T 15/06 345/421 |
| 6,933,933 B2 * | 8/2005 | Fleming | G06F 3/0383 178/18.01 |

(Continued)

FOREIGN PATENT DOCUMENTS

CN 101819462 A 9/2010

OTHER PUBLICATIONS

U.S. Appl. No. 14/084,990, filed Nov. 20, 2013, Herrick et al.

(Continued)

*Primary Examiner* — Kumar Patel
*Assistant Examiner* — Sejoon Ahn
(74) *Attorney, Agent, or Firm* — Zachary D. Hadd

(57) ABSTRACT

Embodiments disclosed herein relate generally to a stylus for texture capture. The stylus includes an image sensing and capture device to permit a surface to be scanned using the stylus and an image may be stored and displayed on an electronic device to represent the texture of the scanned surface.

19 Claims, 8 Drawing Sheets

(56) References Cited

U.S. PATENT DOCUMENTS

| | | | |
|---|---|---|---|
| 7,142,197 B2* | 11/2006 | Wang | G06F 3/0317 345/156 |
| 7,184,033 B2 | 2/2007 | Burrus, IV et al. | |
| 7,348,968 B2 | 3/2008 | Dawson | |
| 7,467,948 B2* | 12/2008 | Lindberg et al. | 439/38 |
| 7,626,575 B2* | 12/2009 | Cho | G06F 3/03545 345/173 |
| 7,627,703 B2* | 12/2009 | Oliver | G06F 3/03545 710/72 |
| 7,643,034 B2* | 1/2010 | Lefebvre | G06T 11/001 345/582 |
| 8,059,105 B2 | 11/2011 | Rosenberg | |
| 8,482,545 B2 | 7/2013 | King-Smith et al. | |
| 8,502,651 B2 | 8/2013 | Birnbaum | |
| 8,723,820 B1 | 5/2014 | Han | |
| 8,773,405 B1 | 7/2014 | Ryshtun et al. | |
| 8,878,823 B1* | 11/2014 | Kremin et al. | 345/179 |
| 8,922,527 B2 | 12/2014 | Ryshtun et al. | |
| 8,956,230 B2 | 2/2015 | Adhikari | |
| 8,988,445 B2 | 3/2015 | Kuchenbecker | |
| 2001/0006383 A1 | 7/2001 | Fleck | |
| 2001/0012206 A1* | 8/2001 | Hayami | B60Q 1/085 362/464 |
| 2002/0021291 A1* | 2/2002 | Cook | 345/183 |
| 2003/0112220 A1 | 6/2003 | Yang et al. | |
| 2003/0133130 A1* | 7/2003 | Takahashi | G01B 11/2545 356/603 |
| 2003/0175024 A1* | 9/2003 | Miyoshi | G03B 17/00 396/154 |
| 2004/0008189 A1* | 1/2004 | Clapper | G06F 3/03545 345/179 |
| 2004/0113915 A1* | 6/2004 | Ohtsuki | G06F 3/04815 345/582 |
| 2005/0083314 A1* | 4/2005 | Shalit | G06F 1/1626 345/179 |
| 2005/0116940 A1 | 6/2005 | Dawson | |
| 2005/0248549 A1 | 11/2005 | Dietz et al. | |
| 2005/0253816 A1* | 11/2005 | Himberg et al. | 345/173 |
| 2007/0139399 A1* | 6/2007 | Cook | G06F 3/03545 345/179 |
| 2008/0030486 A1* | 2/2008 | Cook | G06F 3/03545 345/179 |
| 2008/0186255 A1* | 8/2008 | Cohen | G02B 27/017 345/8 |
| 2009/0167702 A1 | 7/2009 | Nurmi et al. | |
| 2009/0251338 A1* | 10/2009 | Marggraff et al. | 341/20 |
| 2009/0264713 A1 | 10/2009 | Van Loenen | |
| 2009/0303204 A1 | 12/2009 | Nasir et al. | |
| 2009/0303468 A1* | 12/2009 | Itoh | G01B 11/306 356/237.2 |
| 2010/0006350 A1 | 1/2010 | Elias | |
| 2010/0170726 A1 | 7/2010 | Yeh et al. | |
| 2010/0188400 A1* | 7/2010 | Chen et al. | 345/420 |
| 2011/0006982 A1 | 1/2011 | Rhee | |
| 2011/0115751 A1* | 5/2011 | Wernersson | G06F 3/016 345/179 |
| 2011/0155044 A1 | 6/2011 | Burch et al. | |
| 2012/0013530 A1* | 1/2012 | Tsuboi | G02B 27/2214 345/157 |
| 2012/0062521 A1 | 3/2012 | Ahn et al. | |
| 2012/0068964 A1 | 3/2012 | Wright | |
| 2012/0105361 A1 | 5/2012 | Kremin et al. | |
| 2012/0113065 A1* | 5/2012 | Chin | 345/179 |
| 2012/0127110 A1* | 5/2012 | Amm et al. | 345/174 |
| 2012/0146958 A1 | 6/2012 | Oda et al. | |
| 2012/0235935 A1* | 9/2012 | Ciesla | G06F 3/0202 345/173 |
| 2012/0249461 A1 | 10/2012 | Flanagan et al. | |
| 2012/0331546 A1 | 12/2012 | Falkenburg | |
| 2013/0002606 A1 | 1/2013 | Mann | |
| 2013/0021288 A1 | 1/2013 | Karkkainen et al. | |
| 2013/0082830 A1* | 4/2013 | Rosen | G09B 21/003 340/407.2 |
| 2013/0100070 A1 | 4/2013 | Zheng et al. | |
| 2013/0147748 A1* | 6/2013 | Westerinen et al. | 345/173 |
| 2013/0181953 A1* | 7/2013 | Hinckley et al. | 345/179 |
| 2013/0201162 A1 | 8/2013 | Cavilia | |
| 2013/0207925 A1 | 8/2013 | Ryshtun et al. | |
| 2013/0249823 A1 | 9/2013 | Ahn et al. | |
| 2013/0257777 A1 | 10/2013 | Benko et al. | |
| 2013/0286033 A1 | 10/2013 | Mesaros et al. | |
| 2013/0286174 A1* | 10/2013 | Urakabe | 348/66 |
| 2014/0002422 A1 | 1/2014 | Stern et al. | |
| 2014/0028635 A1* | 1/2014 | Krah | 345/179 |
| 2014/0055424 A1* | 2/2014 | Mercea et al. | 345/179 |
| 2014/0062962 A1* | 3/2014 | Jang et al. | 345/175 |
| 2014/0092055 A1 | 4/2014 | Radivojevic | |
| 2014/0118127 A1* | 5/2014 | Levesque et al. | 340/407.2 |
| 2014/0132722 A1* | 5/2014 | Martinez Bauza | G01B 11/25 348/46 |
| 2014/0160087 A1 | 6/2014 | Mercea | |
| 2014/0218341 A1* | 8/2014 | Ichieda | G06F 3/0425 345/175 |
| 2014/0229858 A1 | 8/2014 | Bleker et al. | |
| 2014/0253522 A1 | 9/2014 | Cueto | |
| 2014/0267184 A1 | 9/2014 | Bathiche et al. | |
| 2015/0002481 A1 | 1/2015 | Mereca | |
| 2015/0138128 A1 | 5/2015 | Harrick et al. | |
| 2015/0169056 A1 | 6/2015 | Weddle et al. | |
| 2015/0181191 A1* | 6/2015 | Iwai | G01B 11/25 348/48 |
| 2015/0212578 A1 | 7/2015 | Lor et al. | |

OTHER PUBLICATIONS

U.S. Appl. No. 14/165,488, filed Jan. 27, 2014, Lor et al.
Kamuro et al., "Pen de Touch" International Conference on Computer Graphics and Interactive Techniques archive Siggraph, 2009 Emerging Technologies, New Orleans, Louisiana, Aug. 7, 2009.

* cited by examiner

TEXTURE CAPTURE STYLUS AND METHOD

TECHNICAL FIELD

Embodiments disclosed herein relate generally to styli that may include additional components for sensing, recording and transmitting an image of the texture of a surface.

BACKGROUND

In the visual arts, texture is the perceived surface quality of an image or work of art. It is an element of two-dimensional and three-dimensional design and is distinguished by its perceived visual and physical properties. Use of texture, along with other elements of design, can convey a variety of messages and emotions. For example, use of rough surfaces can be visually active, while smooth surfaces can be visually restful. Physical texture, also known as actual texture or tactile texture, are the actual variations upon a surface. Physical texture has a physical quality that is a combination of how the surface looks, and how it feels to the touch. For example, in a painting, physical texture is based on the paint, and its application, or the addition of materials such as ribbon, metal, wood, lace, leather and sand either on the surface of, or mixed with, the paint.

Visual texture is the illusion of having physical texture. Every material and every support surface has its own physical texture that needs to be taken into consideration before creating a visual image which is meant to emulate that physical texture. For example, materials such as canvas and watercolor paper are considerably rougher than, for example, photo-quality computer paper and it may be difficult to create a flat, smooth texture from an image shown on such materials. Photography, drawings and paintings use visual texture both to portray their subject matter realistically and with interpretation. Visual texture in those media is generally created by the repetition of shapes and lines. Simulated texture creates the visual effect of texture without actually adding texture. For instance, texture may be created to look like something other than paint on a flat surface. Alternatively, an image may create the illusion of ripples through the repetition of lines.

Today, the term stylus generally refers to an input tool used with Personal Digital Assistants (PDAs), graphics tablets, Tablet Personal Computers (PCs), and Ultra Mobile Personal Computers (UMPCs). Modern day styli generally take the shape of a writing instrument, such as a pen, and are made to comfortably fit in the grip of a user's hand. These styli can be found in all different sizes and shapes. Some styli may extend and contract into small, pen-like cylinders, which are easy to store. Other types of styli may be larger or contain additional devices such as microphones.

In electronic applications, the user operates a touchscreen with a stylus, rather than using a finger in order to avoid getting the natural oil from the user's hands on the screen. Use of a stylus also improves the precision of the touch input, allowing use of smaller user interface elements such as icons. Styli may also be used for handwriting or drawing on a touch-sensitive surface such as a computer tablet screen and may assist a user to accurately navigate through menus, send messages etc. As electronic devices have evolved, they have been used more frequently by engineers, artists and other creative individuals for artistic drawings, image creation, graphic design and other uses.

When a user of an electronic device, such as a graphics tablet or a PC, attempts to create an image which includes visual texture, that user may be limited in the type of physical texture he or she can simulate. Thus, it is generally left to the creativeness and efforts of the user to determine the methods and types of visual texture which may be provided. Accordingly, an improved device, method and/or system for capturing, storing, and providing visual texturing information from an image of a sensed surface to an electronic device may be useful in permitting the user to create an image which emulates the texture of the surface that was sensed.

SUMMARY

A stylus is disclosed which includes an apparatus and system for detecting, storing, and simulating the physical attributes of a textured surface. The stylus may include an image sensor contained within or attached to the stylus which senses the physical attributes of a surface over which the stylus is passed. The stylus may include a light transmissive tip through which the image sensor can detect the texture of the surface over which the stylus is passed. The sensor may be a camera which may be contained within the stylus or may otherwise be associated with the stylus. The image which is sensed through the light transmissive tip of the stylus may be stored or immediately utilized to produce an image which visually simulates the texture of the sensed surface or image.

One embodiment utilizes a transparent tip on one end of a stylus as a lens for a camera. An image sensor which may be a pinhole camera or other suitable image sensing device is contained within the stylus such that the image sensor detects the surface texture of the surface over which the clear tip of the stylus is passed. The sensed image is sent to a host computer and may be used to produce a newly created image which includes visual texturing simulating that of the sensed surface. The stylus tip may be physically touched to, passed close to, or passed some distance from the sensed surface depending upon the sensitivity of the camera, the focal point of the tip lens and the desires of the user. By varying the level of detail of the image sensed by the camera, the user may thus determine the level of detail of the type of textured surface which may be captured by the device.

The stylus may include an activation switch or other suitable device to allow the user of the stylus to determine the time and place at which the sensed surface image may be captured. Illumination from an external source or from an illumination device such as a Light Emitting Diode (LED) inside the stylus may be provided to assist in the image capture. The tip of the stylus may function as a lens to present the image to the image sensor device. In one embodiment, the tip of the stylus may be light transparent such that the image sensor device may not require any additional lens structure other than that which is provided by the tip of the stylus. In some embodiments, the illumination may vary to match or symbolize (rather than match) a color or texture of a portion of a captured image, a color or texture over which the stylus is positioned, a color or texture corresponding to an output of the stylus or an output signal generated by the stylus or an associated electronic device, and so on.

In another embodiment of the device, the sensed image is provided to a data storage device which may then store the image for future use. The data storage device could be contained within the stylus or in a laptop computer or electronic tablet or other suitable device which may store the sensed texture image. The sensed image may then be utilized at a later time with the user's device or with a different device of the user or of another user. The stored image may then be communicated to the original or to another stylus to use as a pen or brush in electronic painting applications. The sensed image may be communicated to the data storage device wirelessly or through a direct connection to the stylus.

In yet another embodiment of the device the physical feel of an object, an object in a sensed image, an object corresponding to a portion of the sensed image, or the sensed image itself, may be provided to a user through tactile sensor feedback from a haptic device. In this embodiment, the user is able to experience both the look and feel of the sensed surface image or corresponding object. The visual appearance of the sensed surface/object is provided on a screen of the electronic device while the feel of the surface may be electronically provided to the user through known haptic devices. Such feedback may also be provided based on a color of a sensed image or object, as another example.

Another embodiment of the device may be used to create three dimensional images. In this embodiment the texture surface may be a three dimensional representation of a sculpture or other physically represented surface such as a tool design. In this embodiment, the stylus may be used as part of a three dimensional computer aided design (CAD) system. For example, the stylus may be used to design a complex surface required for a specific tooling application.

DETAILED DESCRIPTION

Generally, embodiments described herein disclose systems and methods for sensing, storing and utilizing an image including a textured surface. Those embodiments may enable graphic designers, engineers, draftsmen, artists, or any other individual to improve the quality and authenticity of images generated electronically by including textured look and feel to those images.

Figure 1:
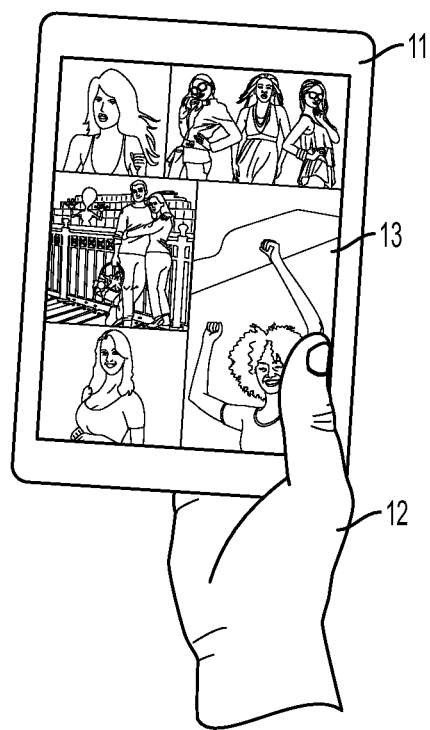
FIG. 1 is a perspective view of an electronic device held by a user.
Figure 2:
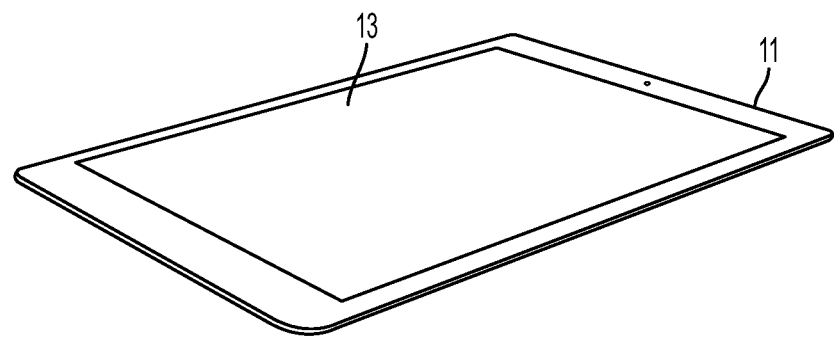
FIG. 2 is a perspective view of an electronic device.
Figure 3:
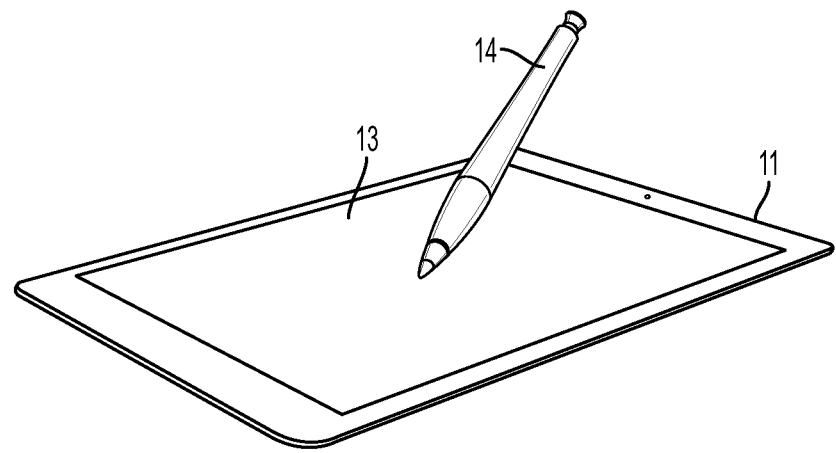
FIG. 3 is a perspective view of an electronic device with a stylus.

Referring to the figures wherein like reference numbers denote like structure throughout the specification, FIG. 1 is a perspective view of an electronic device such as a tablet computer 11 is shown held by a user 12. Tablet computer 11 includes a display screen 13 to display images. FIG. 2 is a perspective view of tablet computer 11 and screen 13. FIG. 3 is a perspective view of tablet computer 11 and screen 13 with a stylus 14 shown contacting screen 13. Stylus 14 may be used in conjunction with tablet 11 and screen 13 to generate visual images on screen 13 or to select certain features or applications from screen 13 by touch. Computer tablet 11 can record video, take photos, play music, and perform Internet functions such as web-browsing and emailing. Other functions of computer tablet 11, including playing games, GPS navigation, social networking, and the like, can be enabled by downloading and installing software applications, commonly known as "apps".

Display 13 may include various sensors. For example an ambient light sensor (not shown) to adjust screen brightness and a 3-axis accelerometer (not shown) to sense orientation and switch between portrait and landscape modes. Tablet computer 11 may support orientation in four orientations, including upside-down. Tablet 11 may include controls to control the device 11 and the display screen 13. Computer tablet 11 may be controlled by the fingers of user 12 applied to or moved adjacent screen 13 (a touch screen) or as shown in FIG. 3 by a stylus 14 which may itself be applied to or moved adjacent screen 13. Styli such as stylus 14 have been used to control various functions of computer tablet 11 such as for example, in word processing applications, to play games, and as drawing tools for various applications.

Figure 4:
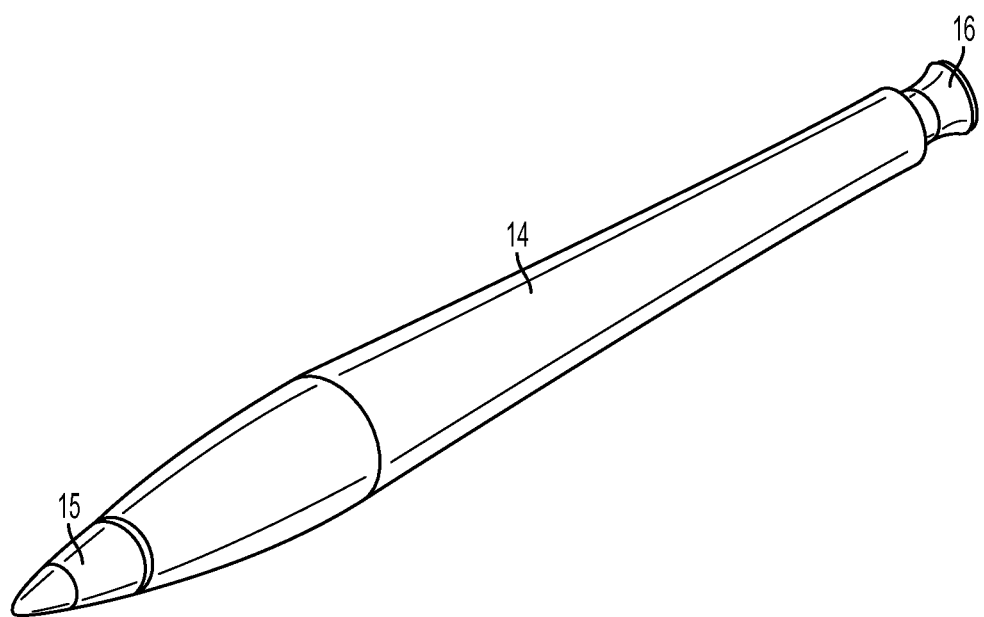
FIG. 4 is a perspective view of an embodiment of a stylus.
Figure 5:
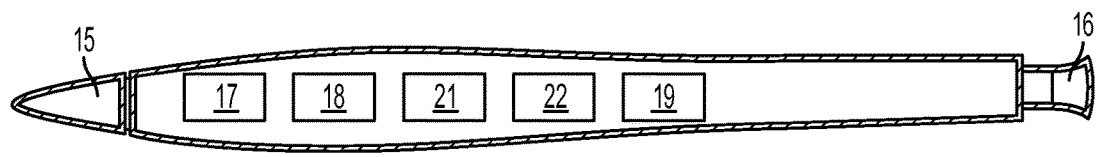
FIG. 5 is a cutaway view of another embodiment of a stylus.

Referring to FIG. 4, stylus 14 is illustrated which includes a light transmissive tip 15, and an off/on button 16. Referring to FIG. 5, a side sectional view of stylus 14 is shown. Tip 15 is configured to act as a lens for an image capture device such as a camera 17 or other suitable image capture device. A power source 18 is electromagnetically connected to off/on button 16 and camera 17 such that user 12 may hold stylus 14 and turn camera 17 on or off by operating button 16. Camera 17 may be a fine scale camera or other suitable imaging device which is used to sense the depth of the image over which tip 15 is passed. A pinhole camera with minimal lens requirement may be used as camera 17. A data transmission device 19 is electromagnetically connected to camera 17 and may transmit data to tablet 11 either wirelessly or by direct connection as is known in the art. A sensed image may then be displayed on screen 13 of computer tablet 11 to allow user 12 to observe the image of the surface texture which is sensed by stylus 14. A light source 21 to provide illumination for camera 17 is connected to power supply 18 and a memory device 22 to store the sensed image data is electromagnetically connected to camera 17. Both light source 21 and memory 22 may be included within, or otherwise associated with, stylus 14. It should be appreciated that any or all of the various elements shown within or comprising the stylus may be electrically and/or physically connected to one another.

Camera 17 may thus be employed to sense the surface over which tip 15 is passed. That is, tip 15 may be passed some distance over, or may be directly in contact with, a surface, depending upon the focal length of lens 15 and the resolution of camera 17. Camera 17 will sense the depths of feature variations on a surface and the change in those distances to determine a texture of the surface and capture that image. It should be appreciated that certain embodiments may include a capture mode during which such variations, textures, features and physical characteristics, and in some cases colors, may be sampled or otherwise captured. Further, embodiments may employ an output or drawing mode in which the captured physical characteristics are reproduced on a display of an associated electronic device in response to motion of the stylus or other input from the stylus (or another input device entirely, thereby permitting the stylus to be used solely for selection and capture).

Stylus 14 may be wirelessly or otherwise electromagnetically connected to computer tablet 11 through transmission device 19 such that the image captured by camera 17 may be transmitted to computer tablet 11 and that image may be displayed on screen 13. Because camera 17 captures the variations in depth from the surface over which tip 15 is passed, the image generated on screen 13 may include a textured appearance. That is, the variations in the surface are displayed in the form of an image with the look and feel of the surface itself. So, for example, stylus tip 15 may be passed over a cloth surface 23 such as that shown in FIG. 6 and the image generated on screen 13 will reflect the surface variations such that user 12 is able to visually reproduce the surface texture of cloth surface 23 on screen 13. This reproduction may occur with respect to any shape, line, or graphic created in response to action of the stylus, such as motion while in a drawing mode.

Likewise, the haptic feedback or feel of the stylus may simulate the feel of touching the cloth surface 23 or any other surface, or of moving a stick or pen over the cloth surface. Thus, as the physical characteristics of the surface captured by the stylus change, so too may the generated image and the haptic feel that result from operation of the stylus. This may provide a user with a tactile indication of the graphic being generated by operation of the stylus, or the graphic to be generated through stylus operation. In some embodiments, the haptic feedback may not simulate any physical characteristic of a surface but may still vary as different surfaces are captured and/or corresponding graphics generated in response to stylus operation. As another example, the haptic output of the stylus may correlate to a color rather than a texture or feel. As yet another example, the haptic output may correlate to a combination of a color and texture, such that a change to either color or texture results in a change to the haptic output. In some embodiments, two haptic output signals may alternate to provide feedback to the user (for example, one output for a color and one for a texture). In another, a single haptic output may be selected, generated or otherwise provided based on both color and texture/feel. For example, a first waveform corresponding to a color output may be combined, merged, multiplexed, or the like with a second waveform corresponding to a texture and the resulting waveform may be used for haptic output of the particular color/texture combination.

In order to provide uniformity in the sensed image, it may be desirable to sample the texture at various positions on the surface. Thus, for example, sensing the surface characteristics at the endpoints and at various points in the center of the surface and then combining those images into a composite image may be useful to prevent repetitive patterns appearing in the reproduced image. The images sensed at different locations on the surface such as cloth 23 may be combined to produce a uniform textured surface. The same may be done with various colors across different regions of an image. Alternatively, the stylus 14 could be held at different distances from the surface to be sensed which would provide varying perspectives on the texture. These images may be stored in memory device 22 and then combined through the use of computer programming.

Further, it should be appreciated that the haptic feedback produced by the stylus, during its operation, may vary with the characteristics of the surface sensed or otherwise captured by the stylus. A surface or surface image may be captured at a first distance, for example, and provide a first haptic feel or feedback. That same surface may provide a different haptic feel or feedback for a user if the surface (or an image thereof) is captured at a second distance, insofar as the field of view of the camera may change, the relative size of any surface features or textures may change within an image captured by the camera, and so on.

Still other embodiments may combine some form of distance sensing or measurement with the aforementioned camera in order to provide a uniform haptic feel or feedback for any given surface, regardless of the distance at which the surface is sampled or otherwise captured. This may permit a stylus to compensate for image capture occurring at differing distances, as one example.

Multiple samples at different locations on surface 23 can be taken to ensure that repetitive images do not result in a visual image which includes the exact same features. The reproduced image may then be randomized and blended with various individual images such that the final composite image does not contain repetitive features. This capability brings added dimensions and applications to computer tablet 11 such as, for example, in art, computer design, and three dimensional modeling.

In order for camera 17 in stylus 14 to correctly sense the surface, illumination of the surface to be sensed is desirable. Thus, an illumination device 21, which may be a light emitting diode or other suitable device may be associated with, or included in, stylus 14 to illuminate the surface such as cloth surface 23 in FIG. 6. Alternatively, external sources of illumination (not shown) may be used to provide proper illumination of surface 23. In either case, the illumination of the surface to be sensed is sufficient to allow camera 17 to obtain an image of the surface texture of cloth surface 23. To capture the textured surface of cloth 23, stylus 14 may be passed over various portions of cloth surface 23 and the images thus sensed by camera 17 may be recorded and saved in a memory device as described below.

Referring again to FIG. 5, stylus 14 is shown which includes a memory device 22. The inclusion of memory device 22 enables the storage of surface images sensed by camera 17. Thus, for example, a user 12 could pass stylus tip 15 over a surface to detect a surface texture and that image stored in memory 22. That surface texture could then be used later on that user's, or a different user's, computer tablet 11. This image storage feature may enable collaboration of users to produce a particular visual image which incorporates the sensed surface textures. It also permits the user to incorporate various surface textures into one visual image or to combine those textures to produce a different texture. Such combinations would be enabled by software applications in computer tablet 11 as is known in the art. A stored image may be used at a later time or in a different device or application. While memory device 22 is shown as included in stylus 14, it can be appreciated that memory device 22 could be located apart from stylus 14, such as, for example, in tablet 11.

Figure 7:
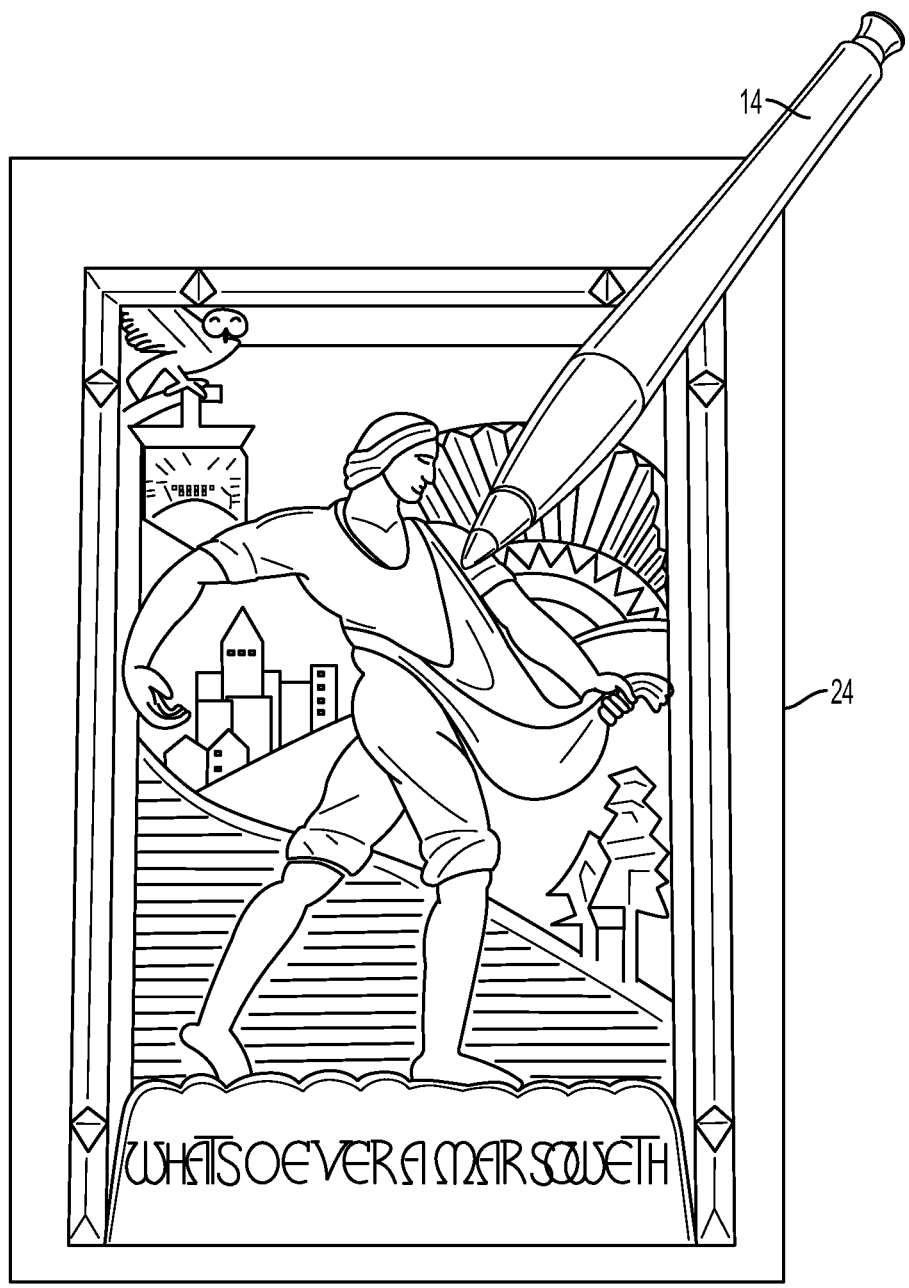
FIG. 7 is a view of a relief sculpture image.

Another embodiment allows the device to sense surface textures and features such as those shown in FIG. 7, and transmit a haptic output to a user corresponding to such textures and/or features. That is, surface textures or variations in a relief painting 24 in FIG. 7 may then be visually displayed on computer tablet 11 or stored as described above to later produce a visual image which represents the various surface characteristics of the sensed image in FIG. 7. Further, as the stylus is moved to generate portions of the visual image, the stylus may also provide haptic feedback corresponding to the texture, features, surface characteristics, and/or other physical characteristics of the stylus output, or an image generated in response to stylus output.

Variations of an image could also be enabled by software applications in computer tablet 11 as is known in the art. Various images of relief painting 24 may be captured by stylus 14 and then those images could be combined to reproduce an image, which may be a three dimensional image, of the relief painting 24 on electronic device 11. In a similar manner, by utilizing stylus 14, a user could also visually reproduce a three dimensional object such as a sculpture.

The ability for a user to sense surface texture variations adds a depth dimension to the visual images which may be generated. No longer will a user be limited by preprogrammed textures or surface features. A user can generate his or her personalized surface textures. These textures may then be integrated or combined in order to produce additional textures in generated visual images. Faux painting or faux finishing are terms used to describe a decorative paint finishes that replicate the appearance of materials such as marble, wood or stone. Using stylus 14 in these applications allows a user to generate realistic two dimensional images by using stylus to sense the texture of the actual surfaces. By employing haptic feedback, designers and modelers may receive touch feedback relating to the "surface" they are sculpting or creating, allowing faster and more natural workflow than traditional methods.

Figure 8:
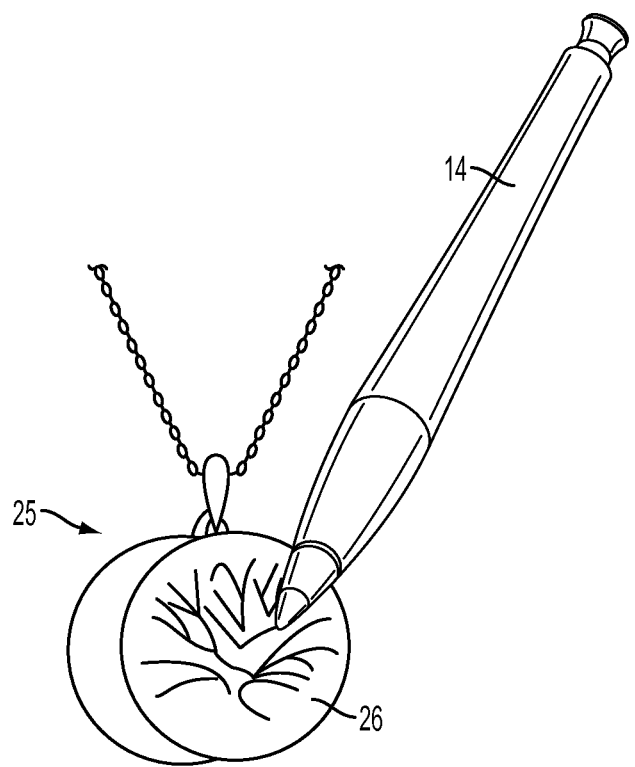
FIG. 8 is a perspective view of engraved jewelry and a stylus.

Another embodiment of the invention can be implemented to engrave jewelry or other items such as metals, plastics, glass and crystal. It is now commonplace for retail stores (mostly jewelry, silverware or award stores) to have a small computer controlled engraving capability on site. This enables them to personalize the products they sell. Referring to FIG. 8, an engraved necklace 25 is shown. Engraving 26 may take any decorative or other aesthetically pleasing form as is known in the art. Engraving 26 could take the form of an inscription conveying sentiments or other information. Retail engraving machines tend to be focused around ease of use for the operator and the ability to engrave a wide variety of items including flat metal plates, jewelry of different shapes and sizes, as well as cylindrical items such as mugs and tankards. They will typically be equipped with a computer dedicated to graphic design that will enable the operator to easily design a text or picture graphic which the software will translate into digital signals telling the engraver machine what to do. The present invention would be employed to assist in this process. The user would pass the stylus 14 over a surface such as engraving 26 in FIG. 8 and the sensed texture could then be used by the engraving machine to reproduce that sensed textured surface on another item. In this way, copies of engravings, signatures etc. could be reproduced or custom engravings etc. could be produced by combining various sensed texture surfaces.

Figure 9:
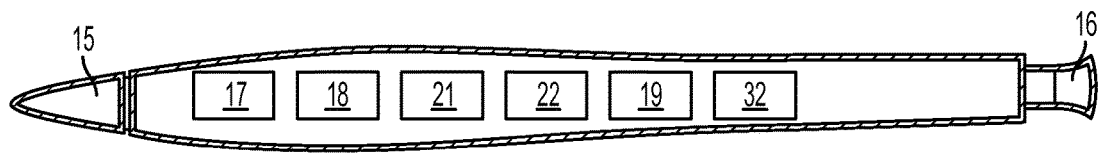
FIG. 9 is a cutaway view of another embodiment of a stylus including an IMU.

An inertial measurement unit (IMU) is used in many navigation systems such as for aircraft, watercraft and others form of transportation. The data collected from the IMU's sensors allows a computer to track the position using a method known in the art as dead reckoning. IMU's detect a current rate of acceleration using one or more accelerometers and detect changes in rotational attributes like pitch, roll and yaw using one or more gyroscopes. Some IMUs include a magnetometer to assist in calibration against orientation drift. In an alternate embodiment, referring to FIG. 9, stylus 14 includes an IMU 32 in addition to camera 17, power source 18, data transmission device 19, light source 21, and memory device 22. Including an IMU allows the stylus 14 to be used to generate three dimensional images as discussed above. It should be appreciated that any or all of the various elements shown within or comprising the stylus may be electrically and/or physically connected to one another.

An IMU 32 could be used in one embodiment in conjunction with camera 17 to generate a three dimensional image from a two dimensional image. For example, stylus 14 could be used to scan an image on screen 13 and, in conjunction with IMU 32, to produce a three dimensional image. With the inclusion of IMU 32, stylus 14 could be used to generate precise measurements as is known in arts such a plotting and vector graphics. Vector graphics is the use of geometrical primitives such as points, lines, curves, and shapes or polygons, which are all based on mathematical expressions, to represent images in computer graphics. Vector graphics are based on vectors (also called paths, or strokes) which lead through locations called control points. Each of these points has a definite position on the x and y axes. Each point, may include the location of the point in the work space and the direction of the vector (which is what defines the direction of the track). Each track can be assigned a color, a shape, a thickness and also a fill. By including an IMU 32 in stylus 14, the precise location of stylus location as well as the orientation of stylus 14 with respect to a reference point can be determined by IMU 32. With this information a three dimensional image may be reproduced from a two dimensional image on screen 13 or from another two dimensional image on a different device or in a different medium as is known in the computer graphics art.

Another embodiment of the invention would allow computer aided design (CAD) engineers to utilize the stylus 14 to produce images which include surface texture as part of the image or to produce three dimensional images. CAD uses computer systems to assist in the creation, modification, analysis, or optimization of a design. CAD software is used to increase the productivity of the designer, improve the quality of design, improve communications through documentation, and to create a database for manufacturing. CAD output may be in the form of electronic files for print, machining, or other manufacturing operations. CAD is also widely used to produce computer animation for special effects in movies, advertising and technical manuals, often called digital content creation. In one embodiment, texture images captured by stylus 14 may be utilized in digital content creation. That is, texture images stored in memory 22 may be sent by transmission device 19 to a computer aided design system which may then implement the texture images in a digital content creation application.

CAD may be used in designing electronic systems, mechanical design or computer-aided drafting which includes the process of creating a technical drawing with the use of computer software. CAD software for mechanical design uses either vector-based graphics to depict the objects of traditional drafting, or may also produce raster graphics showing the overall appearance of designed objects. CAD may be used to design curves and figures in two-dimensional (2D) space; or curves, surfaces, and solids in three-dimensional (3D) space. Stylus 14 could be used in the implementation of such design, particularly in the three dimensional design applications.

Other industrial design applications such as for machining of metal parts or other industrial uses such as engraving stone, clay or similar materials become apparent when the texture images captured by stylus 14 are utilized. In addition, as discussed above, haptics, when used in combination with the stylus of the present invention in virtual or visual arts, such as graphic design, allow the artist to have direct contact with a virtual instrument that produces real-time images. This embodiment provides such designers with more tools to produce more innovative and useful visual images and designs.

In yet another embodiment, stylus 14 could be used to sense variations in surface texture in three dimensional mapping applications. Mapping is creating graphic representations of information using spatial relationships within the graphic to represent some relationships within the data. One type of mapping is the scaled portrayal of geographical features, that is, cartography. In geographical maps the images can correlate directly to geo-spatial properties, or they may symbolize abstractions such as political borders. Traditionally, the paper (or plane) represents the surface of the earth. In this embodiment, stylus 14 is passed over the surface to be mapped and the sensed image is then used to reproduce a visual image which displays various surface characteristics. In a geographic mapping application, this could be used to generate a visual image which provides topographic information. This embodiment could be useful in surveying as well as map creation. For example, in FIG. 10, stylus 14 may be passed over three dimensional map 27 and images of surface variations or features, such as mountain ranges 28 could be captured and sent to computer tablet 11 in order to create a visual two dimensional image of the captured three dimensional image 27 thus providing topographic detail to the two dimensional image.

In addition to producing visual images, the invention could employ haptics to provide tactile feedback to a user. Haptic technology, or haptics, is a tactile feedback technology which takes advantage of the sense of touch by generating forces, vibrations, or motions to the user. This mechanical stimulation can be used to assist in the creation of virtual objects in a computer simulation, to control such virtual objects, and to enhance the remote control of machines and devices (telerobotics). Haptic devices may incorporate tactile sensors that measure forces exerted by the user on the interface. Thus, in one embodiment of the present invention, stylus 14 may be used by a clothing manufacturer to sense the texture of, for example, cloth 23 in FIG. 6. The texture of the cloth may be extracted from a captured image of the cloth, as one example. As the stylus is moved over the cloth (or a stationary image of the cloth is captured), image processing may be employed to extract a texture or other physical feature of the cloth.

The sensed texture surface would then be stored as part of the visual cloth image. The cloth image would then be put on the manufacturer's website. A user would then pass his or her stylus 14 over the image and haptic feedback devices could be used to reproduce the sensed texture of the visual image to a user employing the haptic feedback device. The user would thus sense the texture of the cloth. As an example of one application of this embodiment in the retail clothing industry, users would utilize the sensed texture through haptic feedback and be able to "feel" the texture of clothes for sale on the internet. Likewise, such feedback may be provided based on a color of a sensed image or object, and/or a combination of color and texture, as previously described.

Figure 6:
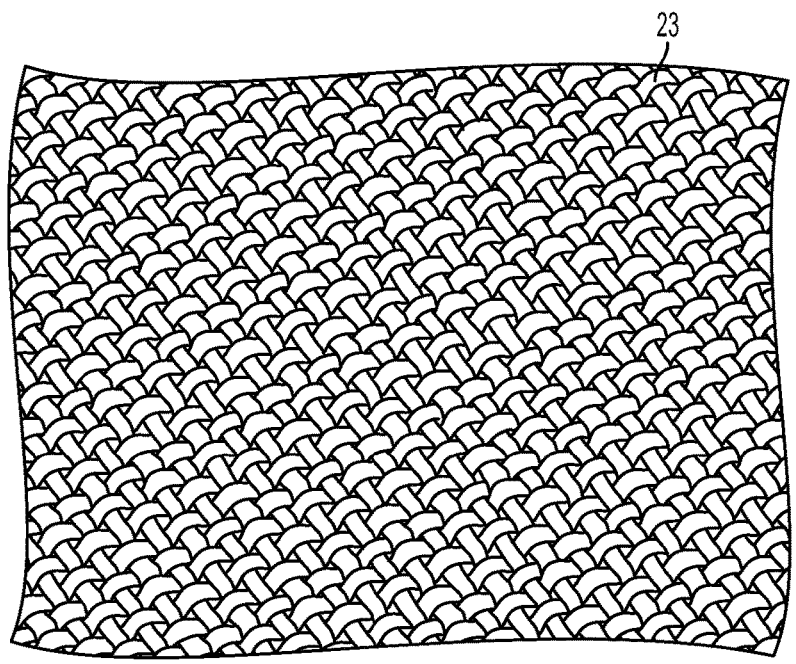
FIG. 6 is a view of a cloth image.
Figure 10:
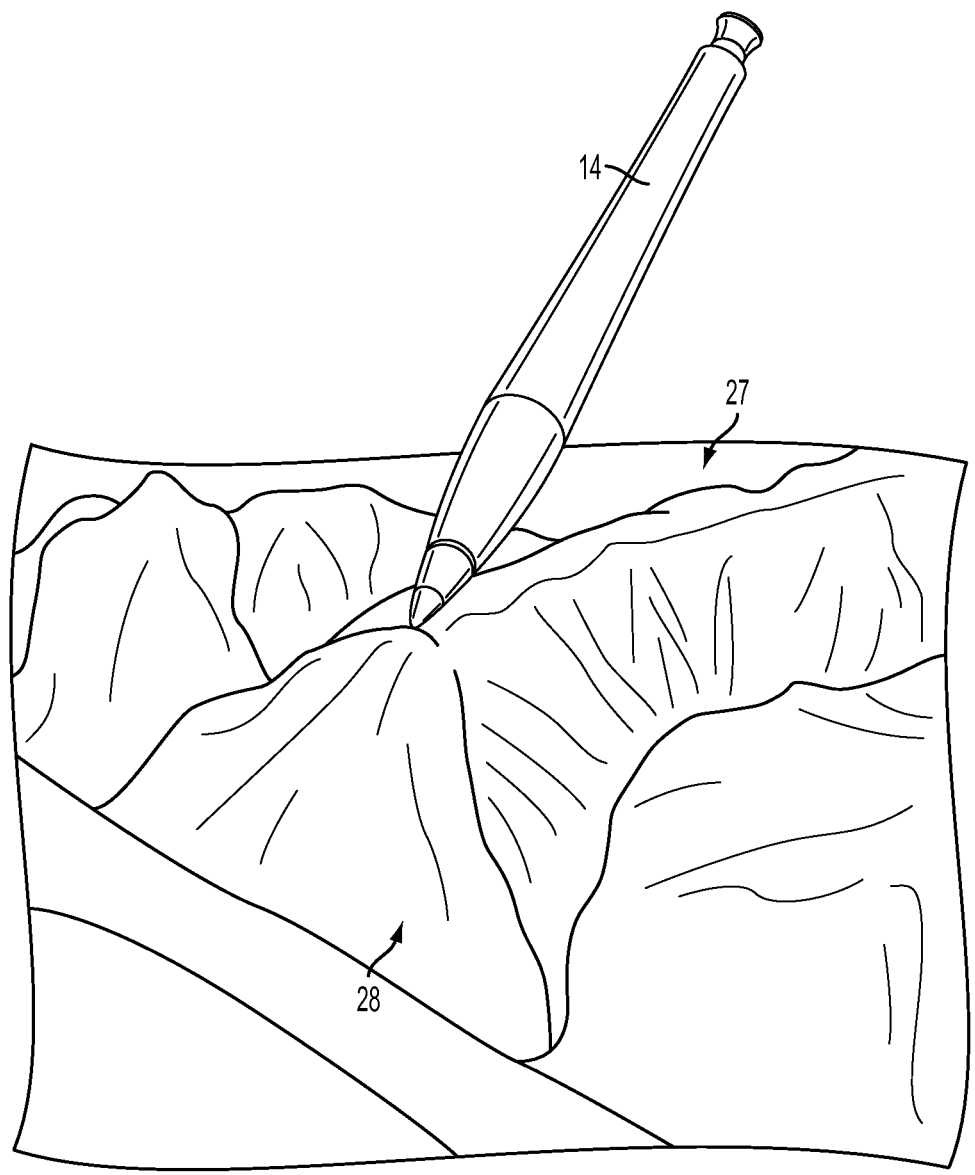
FIG. 10 is a perspective view of a three dimensional map including surface features and a stylus.
Figure 11:
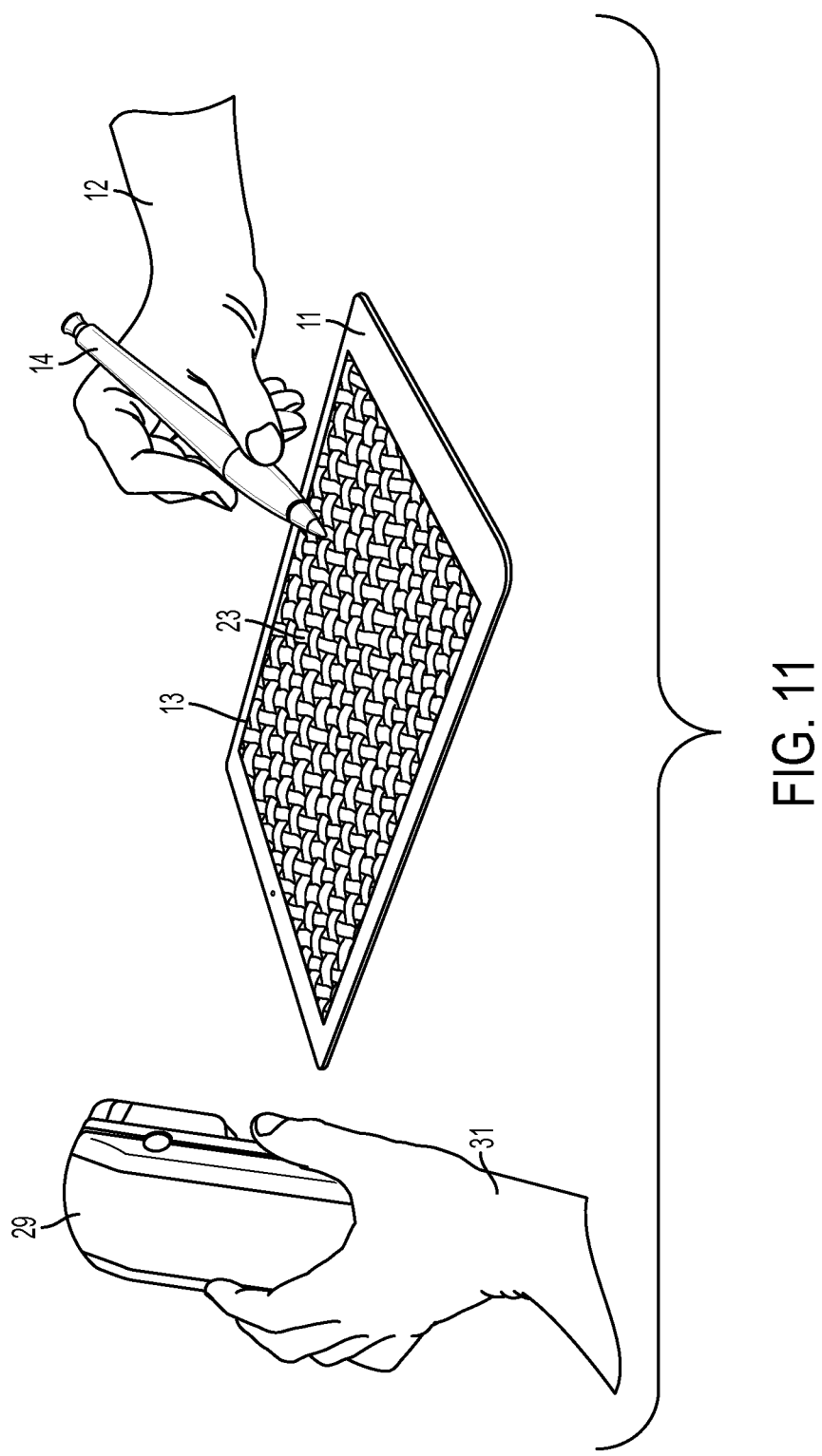
FIG. 11 illustrates a user employing a stylus and haptic feedback.

For example, referring to FIG. 11, in another embodiment a haptic feedback device which may be, for example, a rumble pack 29 such as is known in the electronic gaming arts could be used in conjunction with stylus 14 to generate haptic feedback to a user. An image, such as texture image associated with cloth 23 in FIG. 6, is captured by stylus 14 as discussed above. That captured image is displayed on screen 13 of tablet 11. Stylus 14 is held by user 12 in one hand while rumble pack 29 is simultaneously held in another hand 31 of user 12 as shown in FIG. 10. As stylus 14 is passed over screen 13, the image is sensed by stylus 14 and the corresponding texture information is conveyed to rumble pack 29 by software associated with computer tablet 11. User 12 is thus able to visually observe the image on screen 13 while feeling the texture of the displayed image through rumble pack 29. The combination of visual and tactile input to user 12 allows the user to experience the "look and feel" of a fabric in the example of FIG. 6. Other haptic feedback devices as are known in the art could also be employed in conjunction with stylus 14 to generate tactile feedback to a user. It should be appreciated that substantially any suitable haptic feedback mechanism may be employed in embodiments.

In an alternate embodiment, a visually impaired person could use stylus 14 and rumble pack 29 as described above. That embodiment would allow the visually impaired person to "feel" an image which is displayed on screen 13 that he or she is otherwise unable to see due to the impairment. The combination of two senses, visual and touch, makes this embodiment useful in other applications such as medicine where a medical professional may use this application to "feel" the image of an x-ray or a magnetic resonance image (MRI).

In certain embodiments, a display may be provided on the stylus, or may be associated with the stylus, and may show a texture and/or color of an output from the stylus. Thus, if moving the stylus produces an output signal that draws a line having a particular texture and/or color, that same texture and/or color may be shown on the display even if the stylus is immobile. Accordingly, a user may relatively easily determine what the output of the stylus is or will be without needing to activate or move the stylus.

Generally, embodiments have been described herein with respect to capturing a texture or other physical characteristic of a surface, and outputting that texture/physical characteristic during or as an operation of the stylus, as well as providing haptic feedback or other feel that simulates or varies with the texture/physical characteristic. However, it should be appreciated that certain visual characteristics, such as color, brightness, saturation, and the like, may also be used as the basis for providing certain haptic outputs to a user. Thus, for example, the haptic output of a stylus during a selection operation or a drawing operation may vary depending on the color and/or brightness of the generated graphic.

While the disclosure has described various embodiments, it should be expressly understood to those of ordinary skill in the art that certain modifications may be made without departing from the spirit or scope of this disclosure. For example, while various configurations have been disclosed for a stylus to enable various applications for texture capture, additional capabilities may be employed without departing from the spirit or scope of the disclosure. Accordingly, the proper scope of this disclosure is set forth in the following claims.

We claim:

1. A stylus comprising: a housing; an image sensing device in the housing; a light transmissive tip on the housing that contacts a surface adjacent to the light transmissive tip and transmits light from the surface to the image sensing device so that the image sensing device captures an image of the surface based on the transmitted light, wherein the surface includes distance variations between the surface and the light transmissive tip, and wherein the image captured by the image sensing device includes the distance variations; a haptic output device that generates a haptic output based on the image captured by the image sensing device in the housing of the stylus; and a light source that illuminates the surface to provide additional light to the image sensing device at least while the image sensing device captures the image, and wherein the additional light provided by the light source is adjusted based on the captured image.

2. The stylus of claim 1, wherein the surface has a texture, wherein the captured image includes the texture of the surface, and wherein the haptic output is based on the texture.

3. The stylus of claim 1, wherein the image sensing device includes a camera.

4. The stylus of claim 1, wherein the light transmissive tip comprises a lens that transmits the light from the surface to the image sensing device.

5. The stylus of claim 1, wherein the image sensing device is operative to capture a texture of the surface and a color of the surface, and wherein the captured image includes the texture of the surface and the color of the surface.

6. The stylus of claim 1 further comprising a power source that provides power to the stylus.

7. The stylus of claim 1 further comprising an inertial measurement unit that generates position data indicative of a position of the stylus relative to the surface.

8. A system comprising:
an electronic device that includes a display screen; and
a stylus in electrical communication with the electronic device, the stylus comprising:
a tip at one end of the stylus; an image sensing device that generates image data in response to light from a surface of an object other than the electronic device, wherein the tip is light transmissive and transmits light from the surface to the image sensing device, wherein the surface includes distance variations between the surface and the transmissive tip, and wherein the image data captured by the image sensing device includes the distance variations; and a haptic output device coupled to the image sensing device that produces a haptic output based on the image data, wherein the haptic output is produced based on the distance variations in the image data.

9. The system of claim 8, wherein the haptic output device produces the haptic output based on the distance variations as the image sensing device generates the image data.

10. The system of claim 8, wherein the image sensing device includes a camera.

11. The system of claim 8, wherein the distance variations form a three-dimensional texture of the surface, and wherein the haptic output device produces the haptic output as the stylus moves over the three-dimensional texture of the surface.

12. The system of claim 8 further comprising an inertial measurement unit that generates position data indicative of a position of the stylus relative to the surface.

13. A method for operating an electronic device having a display screen, the method comprising: scanning a stylus over a plurality of different surfaces,
wherein the plurality of different surfaces each include different distance variations between the plurality of different surfaces and the stylus; capturing images of the plurality of different surfaces with the stylus; storing the captured images in memory in the stylus; selecting one of the captured images for reproduction on the display screen of the electronic device, wherein the selected one of the captured images includes the distance variations of one of the plurality of different surfaces; transmitting the selected one of the captured images to the electronic device; and as the stylus is moved relative to the display screen, displaying the selected one of the captured images on the display screen of the electronic device in response to the movement of the stylus relative to the display screen.

14. The method of claim 13, wherein each of the plurality of different surfaces has a different texture, the method further comprising extracting the different texture from the captured images.

15. The method of claim 13, wherein one of the plurality of different surfaces does not form part of the electronic device, and wherein capturing the images comprises capturing an image of the surface that does not form part of the electronic device.

16. The system of claim 8, wherein the image data is used to generate an image of the surface, and wherein the image of the surface is displayed on the display screen.

17. A system comprising: an electronic device having a display screen; and a stylus in wireless communication with the electronic device, the stylus comprising: a tip; an image sensing device that generates image data in response to light from a surface that has a three-dimensional texture, wherein the surface is an object other than the electronic device, and wherein the three-dimensional texture of the surface includes variations between the surface and the tip; a light source that illuminates the surface to provide additional light to the image sensing device at least while the image sensing device generates the image data, wherein the additional light provided by the light source is adjusted based on the image data; and a wireless transmitter that transmits the image data to the electronic device, wherein the image data is displayed on the display screen as a two-dimensional representation of the distance variations of the three-dimensional texture.

18. The system of claim 17, the stylus further comprising:
a haptic output device that generates a haptic output based on the image data.

19. The system of claim 17, wherein the tip is transparent and comprises a lens that directs the light from the surface to the image sensing device.

* * * * *